United States Patent [19]
Kadota

[11] Patent Number: 5,689,362
[45] Date of Patent: Nov. 18, 1997

[54] ACOUSTO-OPTIC DEFLECTOR DEVICE

[75] Inventor: Michio Kadota, Kyoto, Japan

[73] Assignee: Murata Manufacturing Co., Ltd., Japan

[21] Appl. No.: 662,928

[22] Filed: Jun. 13, 1996

[30] Foreign Application Priority Data

Jun. 15, 1995 [JP] Japan ................. 7-148462

[51] Int. Cl.$^6$ ................................ G02F 1/33
[52] U.S. Cl. .................. 359/305; 359/285; 359/298; 385/1; 385/7; 310/313 B
[58] Field of Search .................. 359/305, 298, 359/313; 385/1, 2, 7; 310/313 D, 313 B

[56] References Cited

U.S. PATENT DOCUMENTS

| | | | |
|---|---|---|---|
| 4,092,060 | 5/1978 | Nunoshita et al. | 350/96.13 |
| 4,532,632 | 7/1985 | Yamashita et al. | 359/305 |
| 4,900,113 | 2/1990 | Hatori | 359/305 |
| 4,940,304 | 7/1990 | Hatori | 359/305 |
| 4,961,632 | 10/1990 | Hatori et al. | 359/305 |
| 5,083,856 | 1/1992 | Hatori et al. | 385/7 |
| 5,101,294 | 3/1992 | Jain et al. | 359/285 |
| 5,138,482 | 8/1992 | Hatori et al. | 359/305 |

FOREIGN PATENT DOCUMENTS

| | | |
|---|---|---|
| 62-034125 | 2/1987 | Japan. |
| 62-034126 | 2/1987 | Japan. |

OTHER PUBLICATIONS

I. Shibayama, "Interaction between surface acoustic waves and optical surface wavs", *Surface Acoustic Wave Engineering*, The Institute of Electronics and Communication Engineers of Japan, Tokyo, Chap. 7, pp. 132-141 (1983).

Sunita, Jain, et al., "Thin film layered structure for acousto-optic devices", *Journal of Phsyics D: Applied Physics*, vol.25, No. 7, Jul. 14, 1992.

Anisimikin, V.I. et al., "Piezoelectric films for acoustoelectronic devices: fabrication, properties, and application", *Soviet Physics: Technical Physics*, vol. 35, No. 6, Jun. 1, 1990.

Srivastava, et al., "Electrical Characteristics of Lithium–Doped ZnO Films", *Journal of the Electrochemical Society*, vol. 136, No. 11, Nov. 1989.

Patent Abstracts of Japan, vol. 011, No. 216 (P–595), 14 Jul. 1987 & JP–A–62 034125, Feb. 14, 1987.

Patent Abstracts of Japan, vol. 011, No. 216 (P–595), 14 Jul. 1987 & JP–A–62 034126, Feb. 14, 1987.

*Primary Examiner*—Loha Ben
*Attorney, Agent, or Firm*—Ostrolenk, Faber, Gerb & Soffen, LLP

[57] ABSTRACT

An acousto-optic deflector device having a piezoelectric thin film and IDT formed on a substrate for deflecting a light by causing an SAW generated at an SAW generator region to interact with the light at a light waveguide region. The piezoelectric thin film is constructed of a first piezoelectric thin film having a relatively high resistance and a high piezoelectricity in the SAW generator region, and a second piezoelectric thin film having a smaller light propagation loss than the first piezoelectric thin film $3a$ in the light waveguide region.

8 Claims, 3 Drawing Sheets

ND OF THE INVENTION

1. Field of the Invention

The present invention relates to an acousto-optic deflector device that deflects the direction of propagation of a beam of light by causing a beam of light that travels within a piezoelectric thin film to interact with a surface acoustic wave, and specifically to an acousto-optic reflector device for use in a laser printer to deflect light therein.

2. Description of the Related Art

Acousto-optic deflector devices today are used to perform scanning operations by deflecting a beam of light such as a laser beam in electrophotographic application apparatus such as laser scanners and laser printers. The acousto-optic deflector device is the one which causes a surface acoustic wave to interact with a beam of light that propagates within a light waveguide region, wherein the interaction between both is used to deflect the direction of propagation of the beam of light. This type of acousto-optic deflector device is described, for example, in "Surface-acoustic-wave Engineering" (published by the Incorporated Body "The Institute of Electronics and Communication Engineers of Japan") under the supervision of I. Shibayama.

FIG. 5 is a plan view schematically showing a known acousto-optic deflector device. The acousto-optic deflector device 51 includes a substrate 52 having a piezoelectric thin film 53 made of ZnO located thereon. An interdigital transducer (hereinafter "IDT") 54 is located on the surface of piezoelectric thin film 53 and includes a pair of comb-shaped electrodes, which are arranged so that electrode fingers of the pair are mutually interdigitated. The area where the IDT 54 is formed is an SAW (surface acoustic wave) exciting region 55A. IDT 54 is formed so as to be in contact with the piezoelectric thin film 53. By applying an electric signal across the electrodes of the IDT 54, surface acoustic waves are exited, and the excited surface acoustic waves propagate in the direction of the arrow X, and reach a light waveguide region 55B.

Prisms 56, 57 are disposed on the piezoelectric thin film 53 and are spaced apart by a predetermined distance. A beam of light 59, such as a laser beam, is projected onto the prism 56 through a polarizer 58. The beam of light then propagates through the light waveguide region 55B of the piezoelectric thin film 53 to the prism 57 which outputs the beam of light from the acousto-optic deflector device 51. The area between the prisms 56, 57 constitutes a light waveguide region 55B.

If an electric signal is applied to the IDT 54, surface acoustic waves excited at IDT 54 will reach the light waveguide region 55B, where the SAW and the beam of light interact, and the direction of propagation of the laser beam will be deflected as a diffracted light 60a by a deflection angle $2\theta_B$ ($\theta_B$=Bragg angle) determined by both the wave number of the surface acoustic waves and the frequency of the laser light. In this case, the diffracted light 60a is output from the prism 57, and then fed to a photomultiplier 61a. The beam of light 60b is one which is not deflected by the SAW.

The conventional acousto-optic deflector device 51 has a generally uniform piezoelectric thin film 53 formed on the upper surface of the substrate 52 as described above, the SAW generator region 55A is constructed of the piezoelectric thin film 53 and IDT 54, and the light waveguide region 55B is formed spaced from the SAW generator region 55A.

As should be clear from the foregoing, the piezoelectric thin film 53 of the prior art acousto-optic device 51 has two functions; one as a piezoelectric material for generating the surface acoustic waves and the other as a material for guiding the light beam. In a good acousto-optic deflector device, both the piezoelectric characteristic and the light propagation characteristic of the piezoelectric thin film 53 should be excellent.

In order to exhibit good piezoelectric characteristics, piezoelectric thin film having a high specific resistance should be used to enhance piezoelectricity and SAW generation efficiency. When a ZnO thin film is for this purpose, the ZnO thin film must be doped with a metal such as Li, Cu, and Ag. This reduces the transparency of the piezoelectric thin film with the result that the light propagation characteristic of the piezoelectric thin film is degraded.

If a colorless, transparent ZnO thin film is used as the piezoelectric thin film 53, this will lower the loss involved in light propagation. However, in such a case it is not possible to obtain a large electromechanical coupling coefficient because of a poor c axis orientation or a low specific resistance. As a result, a high SAW generation efficiency cannot be obtained.

As a result, in the prior art acousto-optic deflector device, it is difficult to select a piezoelectric thin film 53 which satisfies both the required piezoelectric characteristic and the required light propagation characteristic at the same time.

SUMMARY OF THE INVENTION

It is therefore one object of the present invention to provide an acousto-optic deflector device that is highly efficient and excellent in performance as a result of good piezoelectric and light propagation characteristics.

An acousto-optic deflector device according to the present invention, includes a substrate, a pair of piezoelectric thin films formed on the substrate, and an IDT formed in contact with the top or bottom surface of the first piezoelectric thin film. The interdigital transducer and the first piezoelectric thin film cooperate to define a SAW generator region. The second piezoelectric thin film includes a light waveguide region. The first piezoelectric thin film has better piezoelectric characteristics and is higher in specific resistance than the second piezoelectric thin film. The second piezoelectric thin film exhibits less light propagation loss than the first piezoelectric thin film.

Considering that a high degree of piezoelectricity is required of the SAW generator region and that a good light propagation characteristic is required of the light waveguide region, the acousto-optic deflector device of the present invention is characterized in that the piezoelectric thin film in the SAW generator region is constructed of the first piezoelectric thin film having an excellent piezoelectric characteristic and a high resistance, and that the light waveguide region of the piezoelectric thin film, of which a good light propagation characteristic is required, is constructed of the second piezoelectric thin film having a small light propagation loss. Since the first piezoelectric thin film has a relatively high resistance and a relatively high electromechanical coupling coefficient, it generates surface acoustic waves in an efficient manner. Furthermore, the second piezoelectric thin film has a small light propagation loss, the light waveguide region offers a reduced light propagation loss. As described above, the acousto-optic deflector device of the present invention is constructed of the first piezoelectric thin film of good piezoelectric characteristic and the second piezoelectric thin film of good light propagation characteristic, the present invention provides an acousto-optic deflector device of excellent performance and high efficiency.

In one embodiment of the invention, the first and second piezoelectric thin films are constructed of a thin film made of a material selected from the group consisting of ZnO, $Ta_2O_5$ and AlN.

In another embodiment of the invention, the first piezoelectric thin film is constructed of a thin film made of a material selected from the group of ZnO, $Ta_2O_5$ and AlN, and said second piezoelectric thin film is constructed of a thin film made of another material also selected from this group.

In still another embodiment of the invention, the first and second piezoelectric thin films are different in thickness.

In still another embodiment of the invention, the first piezoelectric thin film is doped with an impurity to cause the said first piezoelectric thin film to have a specific resistance of $10^5$ $\Omega$·cm or larger.

In still another embodiment of the invention, the impurity is at least one selected from the group consisting of Li, Cu, Ag, Au, Fe, Mn, Ni, Pd, Pt, Co, Rh, Co, Ir, Os, and oxides, nitrides and other compounds of these materials.

In still another embodiment of the invention, the second piezoelectric thin film is constructed of a transparent or translucent piezoelectric thin film.

In the acousto-optic deflector device of the present invention, a first piezoelectric thin film having a relatively high resistance, and a relatively high electromechanical coupling coefficient and an excellent piezoelectric characteristic, is formed on a SAW generator region so that SAW generation is performed in an efficient manner. Furthermore, since a second piezoelectric thin film is constructed of a piezoelectric thin film having a relatively small light propagation loss, the light propagation loss of a light waveguide region is reduced. By constructing the first and second piezoelectric thin films as above, a highly efficient and high-performance acousto-optic deflector device is provided.

In the present invention, as the substrate on which the above acousto-optic deflector device is formed, any appropriate substrate material conventionally used for acousto-optic deflector devices, such as a glass substrate, a quartz substrate, a fused crystal substrate or the like may be employed.

An IDT is formed in a manner that it remains in contact with the top surface or the bottom surface of the piezoelectric thin film as described above. Namely, the IDT may be formed directly on top of the substrate, and in such a case, a piezoelectric thin film (a first piezoelectric thin film) is formed in a manner that it covers the IDT. Alternatively, the IDT may be formed on the bottom or top of the first piezoelectric thin film. The IDT is made up of at least a pair of comb-shaped electrodes, and such comb-shaped electrodes are constructed of an appropriate electrically conductive material such as aluminum.

In the acousto-optic deflector device, appropriate optical path changing devices such as prisms are arranged to guide a light beam to the second piezoelectric thin film in the light waveguide region and then to output a deflected light beam from the second piezoelectric thin film.

In the preferred embodiment of the present invention, the first and second piezoelectric thin films may be constructed of appropriate piezoelectric thin films exhibiting piezoelectricity, and the material constituting such a piezoelectric thin film is not limited to a particular one. Preferably, however, the first and second piezoelectric thin films are constructed of a thin film of a material selected from a group of ZnO, $Ta_2O_5$ and AlN. ZnO, $Ta_2O_5$ and AlN exhibit excellent piezoelectric characteristic, while having a small light propagation loss, and thus the piezoelectric thin film is preferably constructed of one of such materials.

In its particular aspect of the present invention, the first piezoelectric thin film is ZnO, $Ta_2O_5$, or AlN, and the second piezoelectric thin film is another one selected from ZnO, $Ta_2O_5$ and AlN. Since it is necessary for the first piezoelectric thin film to have a higher resistance than the second piezoelectric thin film, and for the second piezoelectric thin film to have a smaller light propagation loss than the first piezoelectric thin film, it is preferable to utilize a ZnO thin film doped with an impurity as the first piezoelectric thin film and to utilize a colorless, transparent ZnO thin film doped with no impurity as the second piezoelectric thin film.

The thicknesses of the first and second piezoelectric thin films may be equal to each other or may be different from each other. The first piezoelectric thin film preferably has a thickness which will enhance the efficiency at which surface acoustic waves are generated in the SAW generator region.

Specifically, the thickness of the first piezoelectric thin film is preferably selected in accordance with the wavelength $\lambda$ of the surface acoustic waves to be generated. In the preferred embodiment, preferably falls within the range determined by $0.35<t/\lambda<0.60$, wherein t is the thickness t of the first piezoelectric thin film, and $\lambda$ is the wavelength of the surface acoustic wave.

On the other hand, the thickness of the second piezoelectric thin film is preferably determined as a function of the light beam introduced into the second piezoelectric thin film. For example, when the wavelength of the incident laser light is 633 nm, the preferred thickness of the second piezoelectric thin film is determined as a function of the mode of light to be converted and the frequency of the surface acoustic waves. For example, where the thin film is formed of ZnO/glass, the appropriate thickness of the first ZnO thin film is approximately 9 µm and the second ZnO thin film is approximately 0.3 µm in diffraction of surface acoustic waves at 130 MHz.

Therefore, it is preferred that the thicknesses of the first and second piezoelectric thin films are separately determined as a function of the above considerations.

To cause the first piezoelectric thin film to have characteristics which are better in film orientation and piezoelectric characteristic and higher in resistance than the second piezoelectric thin film, the piezoelectric thin film is doped with an impurity, preferably to achieve a specific resistance of $10^5$ $\Omega$·cm or greater. With a specific resistance of $10^5$ $\Omega$·cm or greater, the SAW generator efficiency in the SAW generator region is effectively increased.

Impurities which can be used for this purpose are Li, Cu, Ag, Au, Fe, Mn, Ni, Pd, Pt, Co, Rh, Co, Ir, Os and oxides, nitrides and other compounds of these materials, and other metals or metallic oxides of metals other than these materials.

To reduce the light propagation loss of the second piezoelectric thin film, the second piezoelectric thin film is preferably constructed of a transparent or translucent piezoelectric thin film that is not doped with an impurity. By constructing the second piezoelectric thin film of translucent, or more preferably a transparent piezoelectric thin film, loss involved in the propagation of light is effectively reduced.

BRIEF DESCRIPTION OF THE DRAWINGS

For the purpose of illustrating the invention, there is shown in the drawings several forms which are presently preferred, it being understood, however, that the invention is not limited to the precise arrangements and instrumentalities shown.

DETAILED DESCRIPTION OF THE PREFERRED EMBODIMENT

Figure 1:
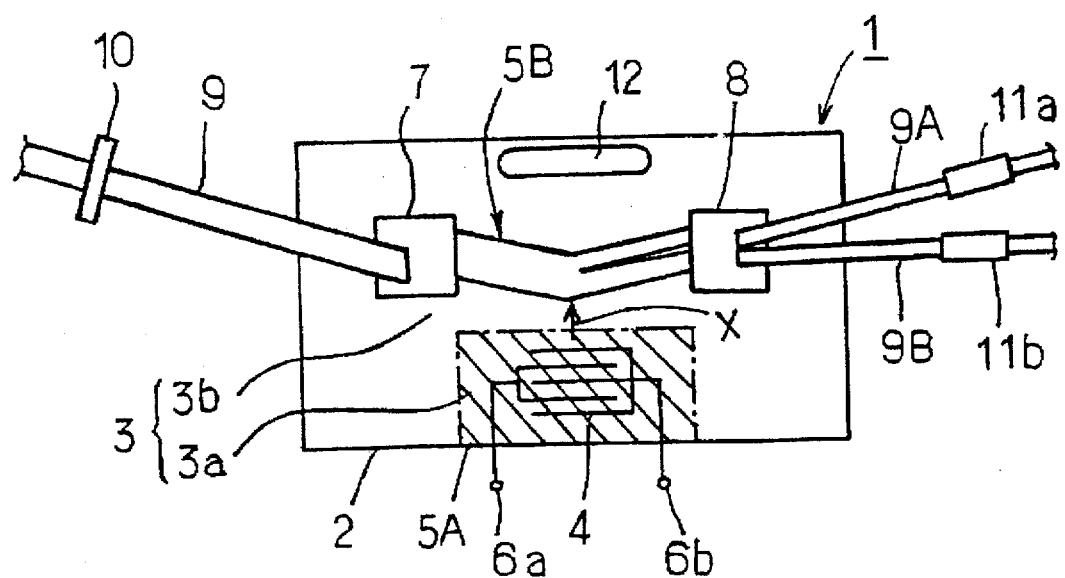
FIG. 1 is a diagrammatic plan view explaining the acousto-optic deflector device according to the embodiment of the present invention.
Figure 2:
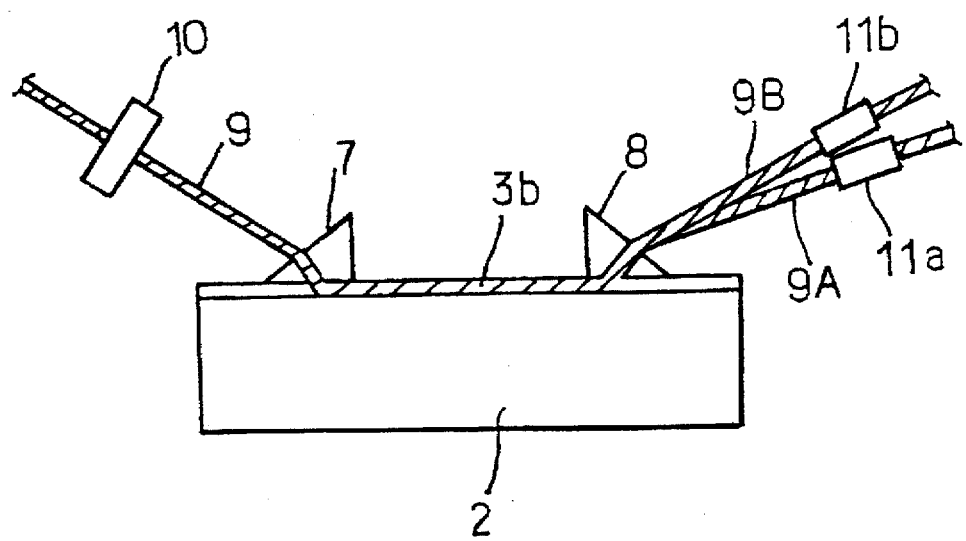
FIG. 2 is a diagrammatic side cross-sectional view explaining the acousto-optic deflector device according to the embodiment of the present invention.
Figure 3:
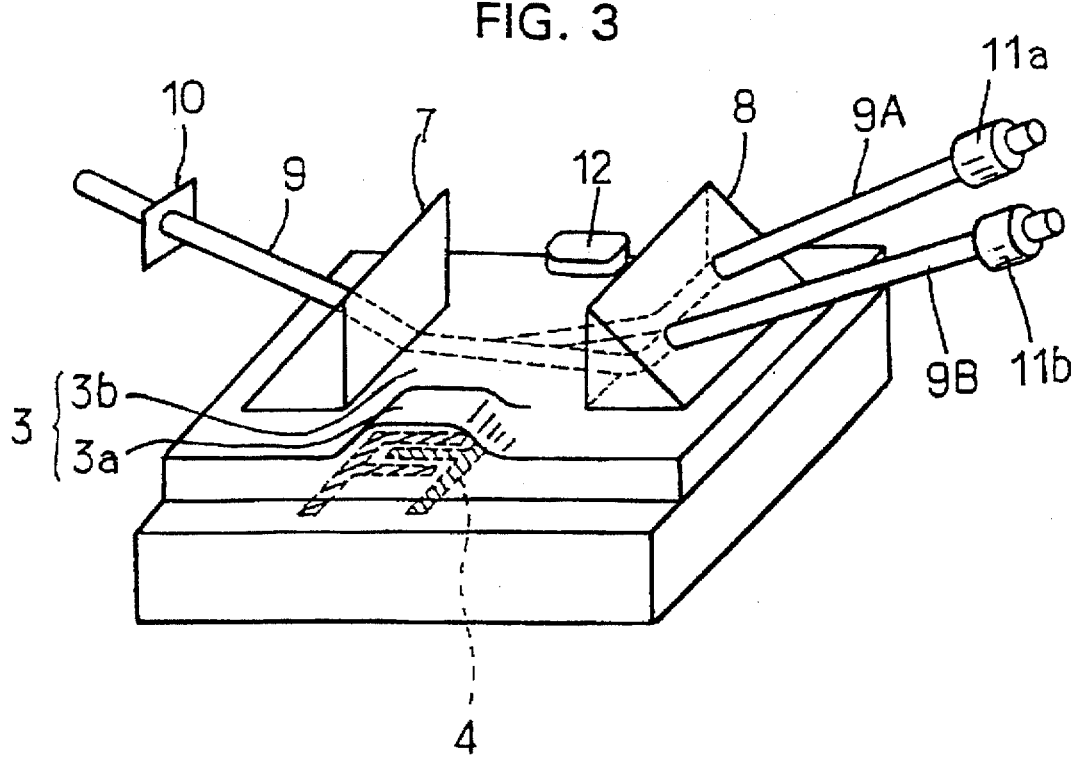
FIG. 3 is a perspective view explaining the acousto-optic deflector device according to the embodiment of the present invention.

Referring now to the drawings wherein like numerals indicate like elements, there is shown in FIGS. 1-3 an acousto-optic deflector device constructed in accordance with the present invention and designed generally as 1. Device 1 includes a substrate 2 of fused crystal, an IDT for generating surface acoustic waves (SAW) and a piezoelectric thin film 3.

The piezoelectric thin film 3 comprises a first piezoelectric thin film 3a and a second piezoelectric thin film 3b.

The first and second piezoelectric thin films 3a and 3b may be two separate films or a film with different sections of the film being doped in different ways and/or otherwise varied in characteristic such that the characteristics of the films 3a and 3b vary relative to one another. The first piezoelectric thin film 3a is formed in a SAW generator region 5A (the hatched area in FIG. 1), and the second piezoelectric thin film 3b is formed in a light waveguide region 5B. In the preferred embodiment, the second piezoelectric thin film is formed on the entire upper surface of the substrate 2 except for the region where the first piezoelectric thin film 3a is formed.

The first piezoelectric thin film 3a is preferably formed of a ZnO thin film 9 µm thick which is doped with Cu to 2 weight percent Cu. The second piezoelectric thin film 3b is preferably formed of a ZnO thin film 0.3 µm thick and is not doped with impurities.

The first piezoelectric thin film 3a is preferably formed on top of an IDT 4. The IDT 4 is made up of a pair of comb-shaped electrodes having a plurality of mutually interdigitated electrode fingers. The comb-shaped electrodes are electrically connected to the outside via terminals 6a, 6b.

As best shown in FIG. 2, the light waveguide region 5B is provided with a pair of prisms 7, 8 which are spaced apart by a predetermined distance. The prism 7 guides a light beam 9 which is first passed through a polarizer 10 into the second piezoelectric thin film 3b. The light beam propagates through the second piezoelectric thin film 3b in the light waveguide region 5B (FIG. 1) and impinges on the second prism 8 which deflects the light beam out of the second piezoelectric thin film 3b and up to photomultipliers 11a, 11b arranged at an angle above the prism 8. As described below, the light beam will be deflected to either the photomultiplier 11a or the photomultiplier 11b depending on whether the light beam has been deflected by a surface acoustic wave. The photomultipliers 11a, 11b generate electrical signals derived from diffracted light 9A and non-diffracted light 9B, respectively, output from the prism 8.

An acoustical absorption material 12 is preferably formed on the piezoelectric thin film 3 at a location diametrically opposite the light waveguide region 5B from the IDT 4. The acoustical absorption material 12 is preferably constructed of a natural or synthetic rubber such as butyl rubber or synthetic resin, having good acoustic absorbing properties, and has the function of absorbing stray surface acoustic waves.

The operation of the acousto-optic deflector device 1 of this embodiment is now described. The light beam 9 is introduced to the prism 7 via the polarizer 10. The prism 7 guides the incident light wave to the second piezoelectric thin film 3b. The light beam 9 propagates along the light waveguide region 5B within the second piezoelectric thin film 3b toward the prism 8.

When an AC voltage is applied across the terminals 6a, 6b, the IDT 4 generates surface acoustic waves. The generated surface acoustic waves propagate in the direction of the arrow X as shown in FIG. 1, and reach the light waveguide region 5B. In the light waveguide region 5B, the light beam 9 propagating through the second piezoelectric thin film 3b interacts with the surface acoustic waves, and, as a result, is deflected as a diffracted beam light 9A. The diffracted light beam 9B impinges on the photomultiplier 11c which generates an electrical signal derived therefrom.

In the case where surface acoustic waves are not generated, non-diffracted. Photomultiplier 11b generates an electric signal derived from the non-diffracted light beam 9B.

In this embodiment, the first piezoelectric thin film 3a is formed on top of the IDT 4 in the SAW generator region 5A. The first piezoelectric thin film 3a has a better orientation, a higher resistance, and an enhanced electromechanical coupling coefficient than the second piezoelectric thin film 3b and therefore generates the surface acoustic waves more efficiently. Furthermore, since light propagation loss in the second piezoelectric thin film 3b is small, the light waveguide region 5B results in small propagation loss in the light beam 9, diffracted light beam 9A and non-diffracted light beam 9B. This embodiment thus provides an acousto-optic deflector device 1 having a highly efficient and excellent performance.

Actual experimental examples are now described to substantiate the advantages of the above embodiment.

Figure 4:
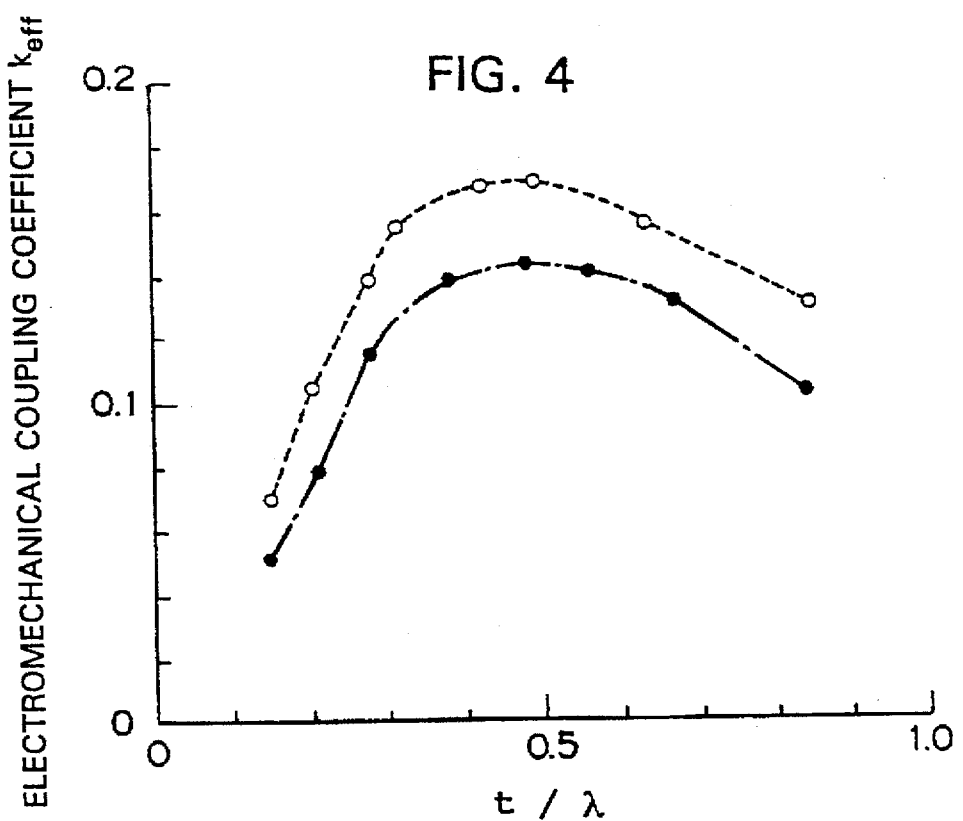
FIG. 4 is a diagram showing the relationship between the thickness of the piezoelectric thin films (H/λ) and electromechanical coupling coefficients.
Figure 5:
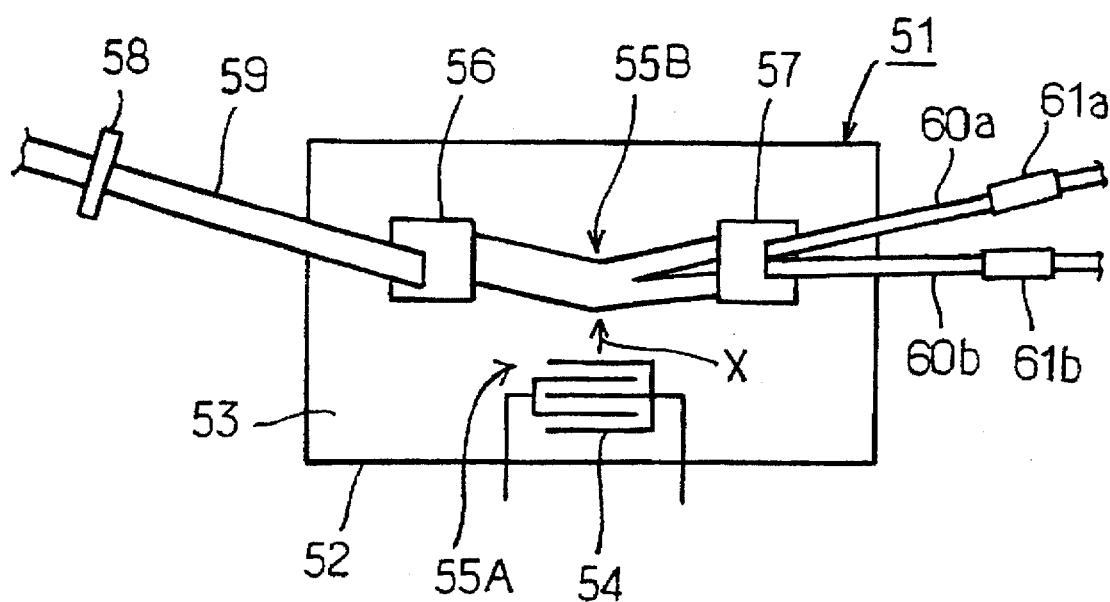
FIG. 5 is a diagrammatic plan view explaining the conventional acousto-optic deflector device.

A 3 to 17 µm thick ZnO thin film doped with Cu to 2 percent Cu by weight as an impurity was formed on a substrate of fused crystal, and its electromechanical coupling coefficient was measured. Formed on the same substrate was a transparent 3 to 17 µm thick ZnO thin film which was not doped with impurities, and its electromechanical coupling coefficient was also measured. FIG. 4 shows measurements of electromechanical coupling coefficients. In FIG. 4, open circles represent measurements of the ZnO thin film doped with Cu, and solid circles represent measurements of the transparent ZnO thin film. As seen from FIG. 4, the ZnO thin film doped with Cu offers higher electromechanical coupling coefficients, thereby exhibiting a better piezoelectric characteristic.

When a laser light having a wavelength of 633 nm was introduced to these two types of ZnO thin films via prisms, the ZnO thin film doped with Cu exhibited a substantial loss to the laser light, and the laser light was unable to travel a distance of 5 mm. In contrast, the transparent ZnO thin film resulted in practically no loss, and the laser light of 633 nm wavelength was excellently transmitted.

Therefore, it is shown that the ZnO thin film doped with impurities is adequate for SAW generation but is inadequate as a light waveguide, and that the transparent ZnO thin film which is not doped with impurities is inadequate for SAW generation but is adequate as a light waveguide.

In the acousto-optic deflector device 1 of this embodiment, when the ZnO thin film doped with Cu in the above experiment is used as the first piezoelectric thin film 3a and the transparent ZnO thin film is used as the second piezoelectric thin film 3b, a high-performance and highly efficient acousto-optic deflector device 1 is provided.

In order to be adequate for SAW generation, the thickness $\lambda$ of the piezoelectric thin film divided by the wavelength of the surface acoustic waves should preferably fall within a range of about 0.35 to 0.60. Therefore, the first piezoelectric thin film 3a should be about 8 to 9 µm thick when the frequency of the surface acoustic wave is 130 MHz. When the wavelength of the incident laser light as the light beam 9 is 633 nm, the appropriate thickness of the second piezoelectric thin film 3b is about 0.3 µm at the light deflection of identical mode. Therefore, the first and second piezoelectric thin films are preferably designed as described above, namely, the thickness of the first and second piezoelectric thin films are preferably different.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An acousto-optic deflector device comprising:

a substrate;

a first piezoelectric thin film formed on the substrate and an interdigital transducer formed in contact with the first piezoelectric thin film to define a SAW generator region, said interdigital transducer being adapted to generate surface acoustic waves which are propagated through said first piezoelectric film along a propagation direction when an exciting voltage is applied thereto;

a second piezoelectric thin film formed on the substrate in a light waveguide region which receives surface acoustic waves generated by the interdigital transducer;

the first piezoelectric thin film exhibiting better piezoelectric characteristics and higher specific resistance than the second piezoelectric thin film, and the second piezoelectric thin film exhibiting less light propagation loss than the first piezoelectric thin film.

2. The acousto-optic deflector device according to claim 1, wherein said first and second piezoelectric thin films are constructed of a thin film made of a material selected from the group consisting of ZnO, $Ta_2O_5$ and AlN.

3. The acousto-optic deflector device according to claim 2, wherein said first piezoelectric thin film is constructed of a thin film made of a material selected from the group consisting of ZnO, $Ta_2O_5$ and AlN, and said second piezoelectric thin film is constructed of a thin film made of a different material selected from that group.

4. The acousto-optic deflector device according to claim 1, wherein said first and second piezoelectric thin films are different in thickness.

5. The acousto-optic deflector device according to claim 1, wherein said first piezoelectric thin film is doped with an impurity to the extent that said first piezoelectric thin film has a specific resistance of $10^5$ $\Omega$·cm or larger.

6. The acousto-optic deflector device according to claim 5, wherein said impurity is at least one selected from the group consisting of Li, Cu, Ag, Au, Fe, Mn, Ni, Pd, Pt, Co, Rh, Co, Ir, Os, and oxides, nitrides and other compounds of these materials.

7. The acousto-optic deflector device according to claim 1, wherein said second piezoelectric thin film is constructed of a transparent or translucent piezoelectric thin film.

8. The acousto-optic deflector device according to claim 1, further including first and second prisms located on the surface of the second piezoelectric thin film, the first prism being for defracting an incoming light beam into the second piezoelectric film for propagation through the second piezoelectric thin film, the second prism being for receiving the light beam propagated through the second piezoelectric thin film and for defracting the light beam outside of the second piezoelectric thin film.

* * * * *